(12) United States Patent
Tsai

(10) Patent No.: US 8,495,353 B2
(45) Date of Patent: Jul. 23, 2013

(54) METHOD AND CIRCUIT FOR RESETTING REGISTER

(75) Inventor: Sheng-Yuan Tsai, Taipei (TW)

(73) Assignee: Inventec Corporation, Taipei (TW)

( * ) Notice: Subject to any disclaimer, the term of this patent is extended or adjusted under 35 U.S.C. 154(b) by 400 days.

(21) Appl. No.: 13/037,387

(22) Filed: Mar. 1, 2011

(65) Prior Publication Data

US 2012/0137114 A1 May 31, 2012

(30) Foreign Application Priority Data

Nov. 30, 2010 (TW) .............................. 99141503 A

(51) Int. Cl.
G06F 15/177 (2006.01)
(52) U.S. Cl.
USPC .......... 713/2; 713/1; 714/10; 714/23
(58) Field of Classification Search
USPC ...................... 713/1, 2; 714/10, 23
See application file for complete search history.

(56) References Cited

U.S. PATENT DOCUMENTS

| 3,805,038 | A | * | 4/1974 | Buedel et al. | 714/31 |
| 5,432,927 | A | * | 7/1995 | Grote et al. | 713/2 |
| 7,111,202 | B2 | * | 9/2006 | Cagle et al. | 714/36 |
| 7,870,378 | B2 | * | 1/2011 | Kuo et al. | 713/2 |
| 2006/0236198 | A1 | * | 10/2006 | Lintz et al. | 714/758 |

FOREIGN PATENT DOCUMENTS

TW M362447 8/2009

* cited by examiner

Primary Examiner — Thuan Du
(74) Attorney, Agent, or Firm — CKC & Partners Co., Ltd.

(57) ABSTRACT

A method for reset a register includes the following step: a computer starts to be booted and perform a booting procedure. Wherein, the computer includes at least one register. Power is supplied to the at least one register. Determine if the computer is booted successfully. If it is determined that the computer fails to be booted, the at least one register is kept to be grounded for a predetermined period of time to reset the at least one register. After the at least one register is grounded, power is supplied to the at least one register again, and the computer is rebooted.

9 Claims, 2 Drawing Sheets

METHOD AND CIRCUIT FOR RESETTING REGISTER

RELATED APPLICATIONS

This application claims priority to Taiwan Application Serial Number 099141503, filed Nov. 30, 2010, which is herein incorporated by reference.

BACKGROUND

1. Field of Invention

The present invention relates to a method and a circuit for resetting a register.

2. Description of Related Art

With the continuous development of computers, the number of chips on a computer is becoming larger and larger, such as a Southbridge and a baseboard management controller. The amount of data stored in registers of these chips is also becoming larger and larger. During boot, the computer often fails to be booted successfully due to an erroneous initialization state of a register on a respective chip.

Furthermore, when a computer on a production line is powered on and starts to be booted and perform a booting procedure for the first time, contents of registers on each chip are unknown, which often causes the computer to fail to be booted during the first boot, thus increasing a reject ratio during manufacturing.

As can be known from the above, it is an important topic regarding how to avoid a failure of booting the computer due to the erroneous contents of a register in the computer.

SUMMARY

Accordingly, an aspect of the present invention is to provide a method for resetting a register for keeping a register of a computer being grounded for a period of time when the computer fails to be booted (i.e. fails to complete the booting procedure), so as to reset the register and reboot the computer. The method for resetting the register includes the following steps: powering on a computer for performing a booting procedure, wherein the computer includes at least one register; supplying power to the at least one register; determining whether the booting procedure is completed successfully, wherein if it is determined that the booting procedure fails to be completed, the at least one is register is kept to be grounded for more than a predetermined period of time for resetting the at least one register; resupplying power to the at least one register and rebooting the computer after the at least one register has been kept to be grounded for more than the predetermined period of time.

According to an embodiment of the present invention, the method for resetting the register can further include: stopping supplying power to the at least one register before the at least one register is kept to be grounded for more than a preset time period.

According to another embodiment of the present invention, the method for resetting the register can further include: determining whether a number of reboot times of the computer is larger than a reboot count threshold before the at least one register is kept to be grounded for more than the predetermined period of time. If the number of reboot times of the computer is not larger than the reboot count threshold, the at least one register is kept to be grounded for more than the predetermined period of time. Moreover, when the number of reboot times of the computer is larger than the reboot count threshold, it is determined that the computer is faulty.

According to another embodiment of the present invention, the step of determining whether the booting procedure is completed successfully includes the following step: determining whether a boot success signal is received within a boot time threshold after the computer starts to be booted and perform the booting procedure. If the boot success signal is not received within the boot time threshold after the booting procedure is performed, it is determined that the computer fails to be booted. The boot success signal can be received through a general purpose input/output (GPIO) interface.

Another aspect of the present invention is to provide a circuit for resetting at least one register of a computer. When the booting procedure fails to be completed, the circuit for resetting the register will keep the at least one register of the computer being grounded for a time period to reset the at least one register and reboot the computer. The circuit for resetting the register includes a power supply circuit, a grounding circuit and a control element. The at least one register is electrically connected to the power supply circuit and the grounding circuit respectively. The control element is electrically connected to the power supply circuit and the grounding circuit. The control element includes a power supply module, a boot status determination module and a reset module. When the computer is powered on, the power supply module drives the power supply circuit to supply power to the at least one register. The boot status determination module determines whether the booting procedure is completed successfully. If it is determined that the booting procedure fails to be completed (i.e. the computer fails to be booted), the reset module stops the power supply circuit from supplying power to the at least one register and makes the grounding circuit keep the at least one computer being grounded for more than the predetermined period of time, so as to reset the at least one register and reboot the computer.

According to an embodiment of the present invention, the control element can further include a reboot count determination module which is used to determine whether a number of reboot times of the computer is larger than a reboot count threshold before the at least one register is kept to be grounded for more than the predetermined period of time. If the number of reboot times of the computer is not larger than the reboot count threshold, the reset module starts to stop the power supply circuit from supplying power to the at least one register and starts to keep the at least one register being grounded for more than the predetermined period of time.

According to another embodiment of the present invention, the circuit for resetting the register can further include a general purpose input/output (GPIO) interface. The GPIO interface is used for electrically connecting the computer to the control element. If a boot status detection module does not receive a boot success signal through the GPIO interface within a boot time threshold after the computer starts to be booted or perform the booting procedure, it is determined that the computer fails to be booted.

It can be known from the above embodiments of the present invention that applying the present invention has following advantages. When the computer fails to be booted (i.e. the booting procedure fails to be completed), the register of the computer can be grounded for being reset to reboot the computer after the register is reset. Therefore, it can be avoided that the computer fails to be booted due to an abnormal initialization state of the register of the computer. Moreover, if the computer still fails to be booted after the register has been reset for several times, it can be determined that the computer is faulty and the faulty cause is not due to the initialization state of the register. Thus, the problem of the faulty computer can be resolved merely by resetting the register of the computer, without needing to return the faulty computer for repairing.

It is to be understood that both the foregoing general description and the following detailed description are by examples, and are intended to provide is further explanation of the invention as claimed.

BRIEF DESCRIPTION OF THE DRAWINGS

In order to make the foregoing as well as other aspects, features, advantages, and embodiments of the present invention more apparent, the accompanying drawings are described as follows.

DETAILED DESCRIPTION

The spirit of the present invention will be clearly described with reference to the accompanying drawings and the detailed embodiments below. From the techniques taught in the present invention, any people of ordinary skills in the art can make various modifications and variations without departing from the spirit or scope of the present invention after understanding preferred embodiments of the present invention.

Figure 1:
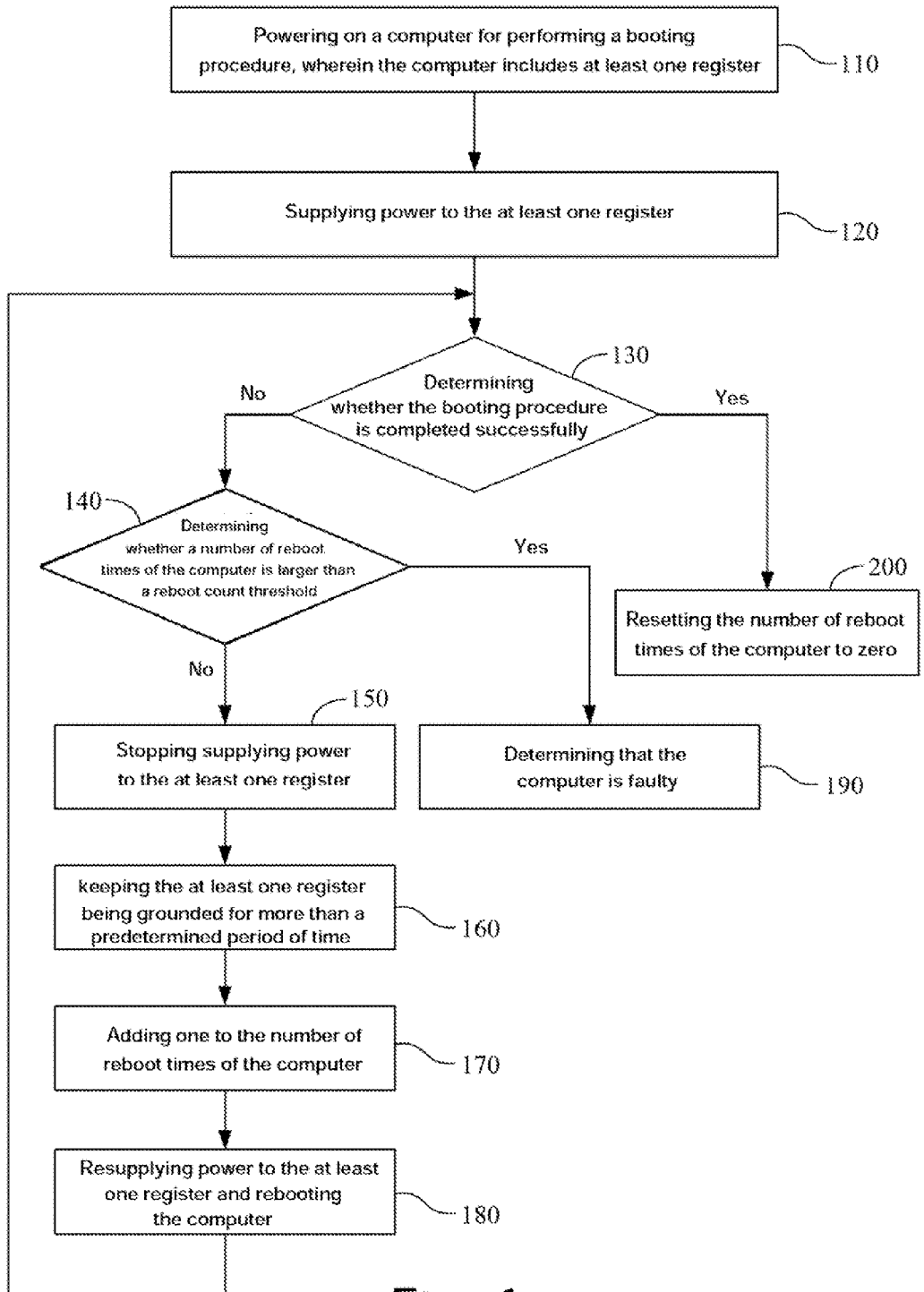
FIG. 1 is a flow chart showing a method for resetting a register according to an embodiment of the present invention.

Referring to FIG. 1, it is a flow chart showing a method for resetting a register according to an embodiment of the present invention. The method for resetting the register keeps a register of a computer being grounded for a period of time when the computer fails to be booted, so as to reset the register and reboot the computer.

The method for resetting the register includes the following steps.

In step 110, a computer is powered on and performs a booting procedure, is i.e. the computer starts to be booted. The computer includes at least one register, such as a register of a Southbridge, a register of a serial input/output (SIO), a register of a non-volatile random access memory (NVRAM), or a register of some other hardware device in the computer.

In step 120, power is supplied to the at least one register. The power can be supplied to the at least one register through a battery, a DC power source or other power supply manners (step 120).

Step 130 is performed for determining whether the booting procedure is completed successfully (i.e. whether the computer is booted successfully), wherein the determination of whether the booting procedure is completed successfully can be made by determining whether a boot success signal is received within a boot time threshold after the computer starts to be booted and perform the booting procedure (step 130). If the boot success signal is not received within the boot time threshold after the booting procedure is performed, it is determined that the computer fails to be booted. However, if the boot success signal is received within the threshold boot time period after the booting procedure is just performed, it is determined that the computer is booted successfully (i.e. the booting procedure is completed successfully). The boot success signal can be received through a general purpose input/output (GPIO) interface. The GPIO interface can receive the boot success signal from the Southbridge or a baseboard management controller (BMC). However, in other embodiments, other manners can also be used to determine whether the computer is booted successfully (step 130), and thus embodiments of the present invention are not limited thereto.

In step 160, if it is determined that the computer fails to be booted, the at is least one register is kept to be grounded for more than a predetermined period of time for being reset. Moreover, before the at least one register is kept to be grounded for more than the predetermined period of time (step 160), the power is stopped from being supplied to the at least one register (step 150).

Then, after the at least one register has been kept to be grounded for more than the predetermined period of time (step 160), power is resupplied to the at least one register, and the computer is rebooted for performing the booting procedure again (step 180). Thereafter, it is determined again whether the computer is booted successfully (step 130). In this way, when the computer fails to be booted, the register can be grounded for being reset. Therefore, a boot failure due to abnormal data in the register during initialization can be avoided.

Moreover, if the boot failure of the computer is not due to the initialization state of the register, the computer still cannot be booted successfully even after the register has been reset for several times. Thus, the method for resetting the register can further include the following step. Before the at least one register is kept to be grounded for more than the predetermined period of time (step 160), it is determined whether a number of reboot times of the computer is larger than a reboot count threshold (step 140). If the number of reboot times of the computer is not larger than the reboot count threshold, the at least one register is kept to be grounded for more than the predetermined period of time (step 160). Moreover, if the number of reboot times of the computer is larger than the reboot count threshold, it is determined that the computer is faulty (step 190). Furthermore, if it is determined that the computer is booted successfully, the number of reboot times of the computer can be reset to zero (step 200). In this way, if the computer still fails to be booted after the register has been reset for several times, it can be determined that the computer is faulty and the fault is not due to the initialization state of the register.

Figure 2:
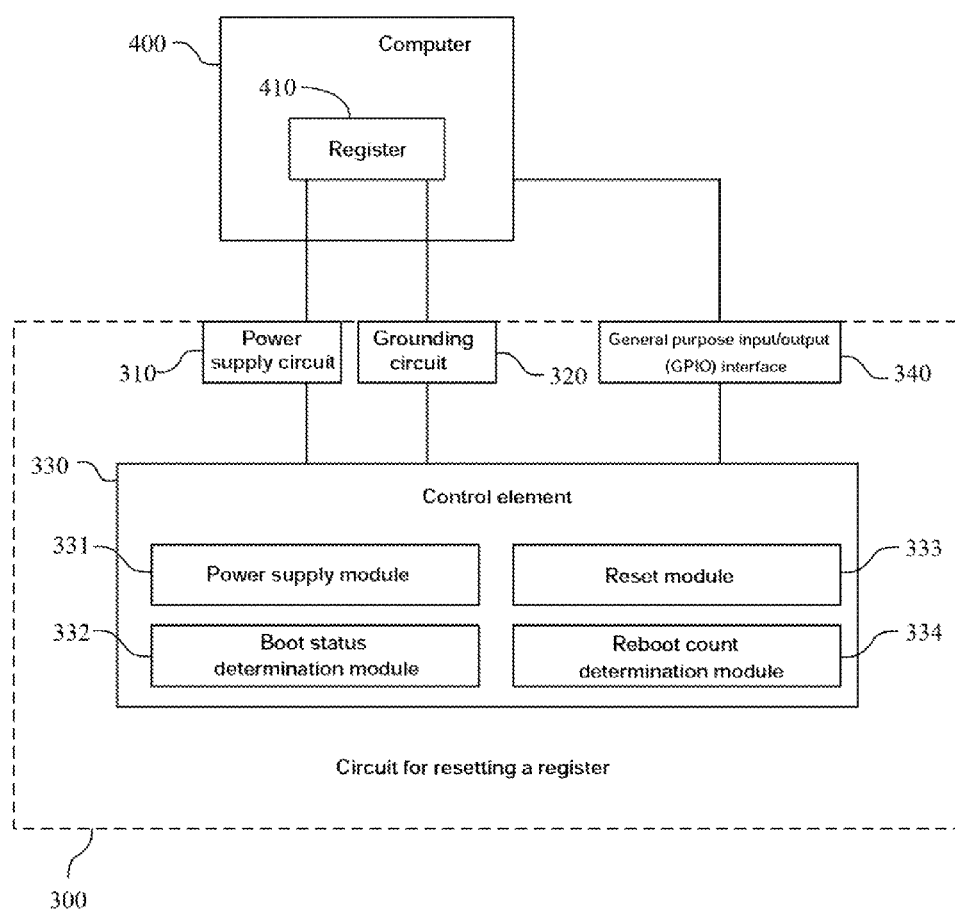
FIG. 2 is a functional block diagram showing a circuit for resetting a register according to an embodiment of the present invention.

Referring to FIG. 2, FIG. 2 is a functional block diagram showing a circuit for resetting a register according to an embodiment of the present invention. When a computer fails to be booted, the circuit for resetting the register keeps a register of the computer being grounded for a period of time so as to reset the register and reboot the computer.

The circuit 300 for resetting the register is used for electrically connecting to a computer 400 and at least one register 410. The register 410 can be a register of a Southbridge of the computer 400, a register of an SIO, a register of an NVRAM, or a register of some other hardware device in the computer 400.

The circuit 300 for resetting the register includes a power supply circuit 310, a grounding circuit 320 and a control element 330. The at least one register 410 is electrically connected to the power supply circuit 310 and the grounding circuit 320 respectively. The control element 330 is electrically connected to the power supply circuit 310 and the grounding circuit 320. The control element 330 can be a complex programmable logic device (CPLD), a programmable integrated circuit (PIC) or some other control element.

The control element 330 includes a power supply module 331, a boot status determination module 332 and a reset module 333. When the computer 400 is powered on, the power supply module 331 drives the power supply circuit 310 to supply power to the at least one register 410. The power supply circuit 310 can supply the power through a battery, a DC power source or other power supply manners.

The boot status determination module 332 determines whether the computer 400 is booted successfully (i.e. the booting procedure is completed successfully). The boot status determination module 332 can determine whether the computer 400 is booted successfully by determining whether a boot success signal is received from the computer 400. Thus, the circuit 300 for resetting the register can further include a GPIO interface 340. The GPIO interface 340 can electrically connect the computer 400 to the control element 330. Furthermore, the GPIO interface 340 can be electrically connected to the Southbridge or the baseboard management controller of the computer 400 to receive the boot success signal from the Southbridge or the baseboard management controller of the computer 400. Therefore, if the boot status determination module 332 does not receive the boot success signal through the GPIO interface 340 within a boot time threshold after the computer 400 is booted, it is determined that the computer 400 fails to be booted. Furthermore, if the boot status determination module 332 receives the boot success signal through the GPIO interface 340 within the boot time threshold after the computer 400 starts to be booted and perform the booting procedure, it is determined that the computer 400 is booted successfully.

If it is determined that the computer 400 fails to be booted, the reset module 333 stops the power supply circuit 310 from supplying power to the at least one register 410 and enables the grounding circuit 320 to keep the at least one register 410 being grounded for more than a predetermined period of time, so as to reset the at least one register 410 and reboot the computer 400. In this way, when the computer 400 fails to be booted, the register 410 can be is grounded for being reset. Therefore, a boot failure of the computer 400 due to abnormal data in the register 410 during initializing can be avoided.

Moreover, if the boot failure of the computer 400 is not due to the initialization state of the register 410, the computer 400 still cannot be booted successfully even after the register 410 has been reset for several times. Thus, the control element 330 can further include a reboot count determination module 334 for determining whether a number of reboot times of the computer 400 is larger than a reboot count threshold before the at least one register 400 is kept to be grounded for more than the predetermined period of time. If the number of reboot times of the computer 400 is not larger than the reboot count threshold, the reset module 333 starts to stop the power supply circuit 310 from supplying power to the at least one register 410 and starts to keep the at least one register 410 being grounded for more than the predetermined period of time. However, if the number of reboot times of the computer 400 is larger than the reboot count threshold, the control element 330 determines that the computer 400 is faulty and the faulty cause is not due to the initialization state of the register 410.

It can be know from the above embodiments of the present invention that the application of the present invention has following advantages. When the computer fails to be booted, the register of the computer can be grounded for being reset to reboot the computer after the register is reset. In this way, it can be avoided that the computer fails to be booted due to an abnormal initialization state of the register of the computer. Moreover, if the computer still fails to be booted after the register has been reset for several times, it can be determined that the computer is faulty and the fault is not caused by the initialized state of the register. Thus, the problem of the faulty computer can be solved merely by resetting the register of the computer, without needing to return the faulty computer for repairing.

Although the present invention has been disclosed with reference to the above embodiments, these embodiments are not intended to limit the present invention. It will be apparent to those skilled in the art that various modifications and variations can be made without departing from the scope or spirit of the present invention. Therefore, the scope of the present invention shall be defined by the appended claims.

What is claimed is:

1. A method for resetting a register, comprising:
 powering on a computer for performing a booting procedure, wherein the computer comprises at least one register;
 supplying power to the at least one register;
 determining whether the booting procedure is completed successfully;
 when that the booting procedure fails to be completed is determined, keeping the at least one register being grounded for more than a predetermined period of time to reset the at least one register; and
 after keeping the at least one register being grounded for more than the predetermined period of time, resupplying power to the at least one register and rebooting the computer for performing the booting procedure again.

2. The method of claim 1, further comprising:
 before keeping the at least one register being grounded for more than the predetermined period of time, stopping supplying power to the at least one register.

3. The method of claim 1, further comprising:
 before keeping the at least one register being grounded for more than the predetermined period of time, determining whether a number of reboot times of the computer is larger than a reboot count threshold; and
 if the number of reboot times of the computer is not larger than the reboot count threshold, keeping the at least one register being grounded for more than the predetermined period of time.

4. The method of claim 3, further comprising:
 when the number of reboot times of the computer is larger than the reboot count threshold, determining that the computer is faulty.

5. The method of claim 1, wherein the step of determining whether the booting procedure is completed successfully comprises:
 determining whether a boot success signal is received within a boot time threshold after the computer starts to be booted and perform the booting to procedure; and
 if the boot success signal is not received within the boot time threshold after the booting procedure is performed, determining that the computer fails to be booted.

6. The method of claim 5, wherein the boot success signal is received through a general purpose input/output (GPIO) interface.

7. A circuit for resetting at least one register of a computer, wherein the circuit comprises:
 a power supply circuit electrically connected to the at least one register;
 a grounding circuit electrically connected to the at least one register; and
 a control element electrically connected to the power supply circuit and the grounding circuit, wherein the control element comprises:
  a power supply module for driving the power supply circuit to supply power to the at least one register when the computer is powered on;
  a boot status determination module for determining whether the computer is booted successfully; and a reset module for stopping the power supply circuit from supplying the power to the at least one register and enabling the grounding circuit to keep the at least one register being grounded for more than a predetermined period of time when it is determined that the in computer fails to be booted, so as to reset the at least one register and reboot the computer.

8. The circuit for resetting the register of claim 7, wherein the control element further comprises:

a reboot count determination module for determining whether a number of reboot times of the computer is larger than a reboot count threshold before the at least one register is kept to be grounded for more than the predetermined period of time, wherein, if the number of reboot times of the computer is not larger than the reboot count threshold, the reset module starts to stop the power supply circuit from supplying the power to the at least one register and starts to keep the at least one register being grounded for more than the predetermined period of time.

9. The circuit for resetting the register of claim 7, further comprising:

a general purpose input/output (GPIO) interface for electrically connecting the computer to the control element, wherein, if the boot status detection module does not receive a boot success signal through the GPIO interface within a boot time threshold after the computer starts to be booted and perform a booting procedure, it is determined that the computer fails to be booted.

\* \* \* \* \*